United States Patent [19] [11] 3,737,811

Paige [45] June 5, 1973

[54] ACOUSTIC SURFACE WAVE DEVICE WHEREIN ACOUSTIC SURFACE WAVES MAY BE PROPAGATED WITH AN ELECTRIC FIELD DEPENDENT VELOCITY

[75] Inventor: Edward George Sydney Paige, Worcestershire, England

[73] Assignee: Minister of Aviation Supply in Her Britannic Majesy's Government of the United Kingdon of Great Britain and Northern Ireland, London, England

[22] Filed: Feb. 8, 1971

[21] Appl. No.: 113,587

[30] Foreign Application Priority Data

Feb. 13, 1970 Great Britain........................6,972/70

[52] U.S. Cl......................333/30 R, 333/72, 310/8.1, 330/5.5

[51] Int. Cl..........H03h 9/30, H03f 13/00, H01v 7/02

[58] Field of Search.........................333/30, 72, 30 R; 178/5.4; 330/5.5; 343/8

[56] References Cited

UNITED STATES PATENTS

| | | | |
|---|---|---|---|
| 3,286,205 | 11/1966 | Ballato | 333/30 R |
| 3,293,557 | 12/1966 | Denton | 333/30 R |
| 3,295,064 | 12/1966 | White | 333/30 R |
| 3,537,039 | 10/1970 | Schafft | 333/30 R |
| 3,678,305 | 7/1972 | Paige | 333/30 R |
| 3,582,540 | 6/1971 | Adler | 178/5.4 |
| 3,388,334 | 6/1968 | Adler | 330/5.5 |
| 3,559,115 | 1/1971 | De Vries | 333/72 |
| 3,200,354 | 8/1965 | White | 333/30 |
| 3,406,358 | 10/1968 | Seidel | 373/71 |
| 3,614,643 | 10/1971 | Slabodnik | 330/5.5 |
| 3,568,102 | 3/1971 | Tseng | 333/30 |
| 3,289,114 | 11/1966 | Rowen | 333/30 |
| 3,568,079 | 3/1971 | Yoder | 330/5.5 |
| 3,573,673 | 4/1971 | De Vries | 333/72 |

OTHER PUBLICATIONS

Kazan, B, "Field-Effect-Controlled Surface Wave Device" IBM. Tech. Disclosure Bull. Vol. 13, No. 4, 9-1970, pp. 914-915

Auld et al. "Control of Acoustic Surface Waves with Photo-Conductive CDS Film," Applied Physics Lett. Vol. 18, 4-1971 pp. 339-341

*Primary Examiner*—Rudolph V. Rolinec
*Assistant Examiner*—Wm. H. Punter
*Attorney*—Hall, Pollock & Vande Sande

[57] ABSTRACT

An acoustic wave device relies on its effectiveness not on the piezoelectric effect but on the elastic stiffness effect and the electro-elastic stiffness effect whereby the effectiveness of the device is electric field dependent.

11 Claims, 18 Drawing Figures

ACOUSTIC SURFACE WAVE DEVICE WHEREIN ACOUSTIC SURFACE WAVES MAY BE PROPAGATED WITH AN ELECTRIC FIELD DEPENDENT VELOCITY

CROSS REFERENCE TO RELATED APPLICATION

Paige U. S. application Ser. No. 113,010, filed Feb. 5, 1971, for "Acoustic Surface Wave Devices."

BACKGROUND OF THE INVENTION

The present invention relates to acoustic surface wave devices.

The velocity of acoustic surface waves propagated on the surface of a medium is determined by the elastic constants and density of the medium. The velocity may be locally modified by mechanical loading of the surface with a film of material dissimilar to that of the medium. Alternatively, if the medium is piezoelectric the velocity is also dependent on the piezoelectric constants, and the medium is said to be piezoelectrically stiffened. In such a case the velocity may be modified locally by the electrical as well as the mechanical interaction with the surface film.

SUMMARY OF THE INVENTION

According to the present invention there is provided an acoustic surface wave device including a body of material which has an elastic stiffness tensor and an electro-elastic stiffness tensor as hereinafter defined such that the velocity of an acoustic wave travelling in a first given direction can be varied by varying an electric field applied in a second given direction, and means for applying an electric field to the body in the second given direction.

Material which has an elastic stiffness tensor and an electroelastic stiffness tensor such that the velocity of acoustic waves can be varied by varying an electric field applied to the material will be referred to hereinafter as "material of the type described."

The elements of the stress tensor $\underline{\underline{T}}$ in a crystal due to strain $\underline{\underline{S}}$ and electric fields $\underline{E}$ are given (to a certain approximation) by the equation $$T_{jk} = (c_{jkmn} + a_{ijkmn}E_i + b_{iljkmn} E_iE_l)S_{mn} + + (e_{ijk} + \tfrac{1}{2}g_{iljk} E_l + \tfrac{1}{3}h_{ilhjk} E_l E_h)E_i \quad (1)$$

where $c_{jkmn}$ is an element of the elastic stiffness tensor, $a_{ijkmn}$ and $b_{iljkmn}$ are elements of tensors that are referred to herein as the electroelastic stiffness tensors, and $e_{ijk}$, $g_{iljk}$ and $h_{ilhjk}$ are elements of the piezoelectric and first and second order electrostrictive tensors respectively. The summation conventions is adopted whereby the sum is automatically taken over any suffix which occurs twice in any product. negligible comprising If the local electric field consists of a contribution $\underline{E}_1$ induced by the presence of an acoustic surface wave and a contribution $\underline{E}_0$ from an externally applied electrostatic potential gradient, so that $$\underline{E} = \underline{E}_0 + \underline{E}_1 \quad (2)$$

and if, further, $$E_1 << E_0 \quad (3)$$

then to a first order of approximation the stress $\underline{\underline{T}}_1$ due to the acoustic surface wave $\underline{\underline{S}}_1$ and $\underline{E}_1$ is given by the equation $$T_{1jk} = (c_{jkmn} + a_{ijkmn}E_{0i} + b_{iljkmn}E_{0i}E_{0l})S_{1mn} + + (e_{ijk} + g_{iljk}E_{01} + h_{ilhjk}E_{0l}E_{0h})E_{1i}, \quad (4)$$

where $S_{1mn}$ is an element of the strain tensor $\underline{\underline{S}}_1$ due to the acoustic surface wave.

Using equation (4) an effective elastic stiffness constant $c_{jkmn}$ (*eff*) can be derived, where the effective elastic stiffness constant $c_{jkmn}$ (*eff*) is defined by $$T_{1jk} + c_{jkmn}(eff)S_{1mn}. \quad (5)$$

The effective elastic stiffness constant $c_{jkmn}(eff)$ is then given by $$c_{jkmn}(eff) = c_{jkmn} + a_{ijkmn}E_{0i} + b_{iljkmn}E_{01}E_{01} + \frac{(e_{pjk} + \tfrac{1}{2}g_{pljk}E_{01} + \tfrac{1}{3}h_{plhjk}E_{01}E_{0h})(e_{qmn} + \tfrac{1}{2}g_{qlmn}E_{0p} + \tfrac{1}{3}h_{qlhmn}E_{01}E_{0h})k_pk_q}{\epsilon_{pq}k_pk_q} \quad (6)$$

where $\epsilon_{pq}$ is an element of the permittivity tensor and $k_p$ a component of the wave vector. The velocity $v$ of an acoustic surface wave is given by a relation of the form:

$$v^2 = c(eff)/\rho,$$

where $\rho$ is the density of the crystal and $c(eff)$ is an appropriate combination of elements $c_{jkmn}(eff)$. It is now clear that the velocity of acoustic surface waves is electric field dependent since $c_{jkmn}(eff)$ will vary either as $E_0$ or $E_0^2$ etc., depending upon whether or not certain tensor elements are zero. For an appreciable field dependence of the velocity some of the elements of the electrostrictive tensors $\underline{g}$ and $\underline{h}$ and the electro-elastic stiffness tensors $\underline{\underline{a}}$ and $\underline{\underline{b}}$ must be large.

In other words a material whose electrostrictive tensors or electro-elastic stiffness tensors have elements that are sufficiently large behaves like a material in which the elastic stiffness constant and hence the velocity of acoustic waves can be varied by means of an externally applied voltage.

In a practical device it is sometimes advantageous to choose for the material which delineates the device on the surface a material the effect of which on the velocity of the acoustic surface wave due to mechanical effects is very small.

Similarly in materials which happen to be piezoelectric as well as of the type described a density change may be brought about by a change in volume due to piezoelectric deformation in the electric field. This effect is usually small. In addition changes in length brought about by piezoelectric deformation in the electric field may affect the operation of certain devices. In general it is possible to choose materials such that such effects, while not insignificant, will be very small.

BRIEF DESCRIPTION OF THE DRAWINGS

Embodiments of the invention will be described by way of example with reference to the accompanying drawings in which.

BRIEF DESCRIPTION OF THE DRAWINGS

Figures 1, 2, 3, 4, 5:
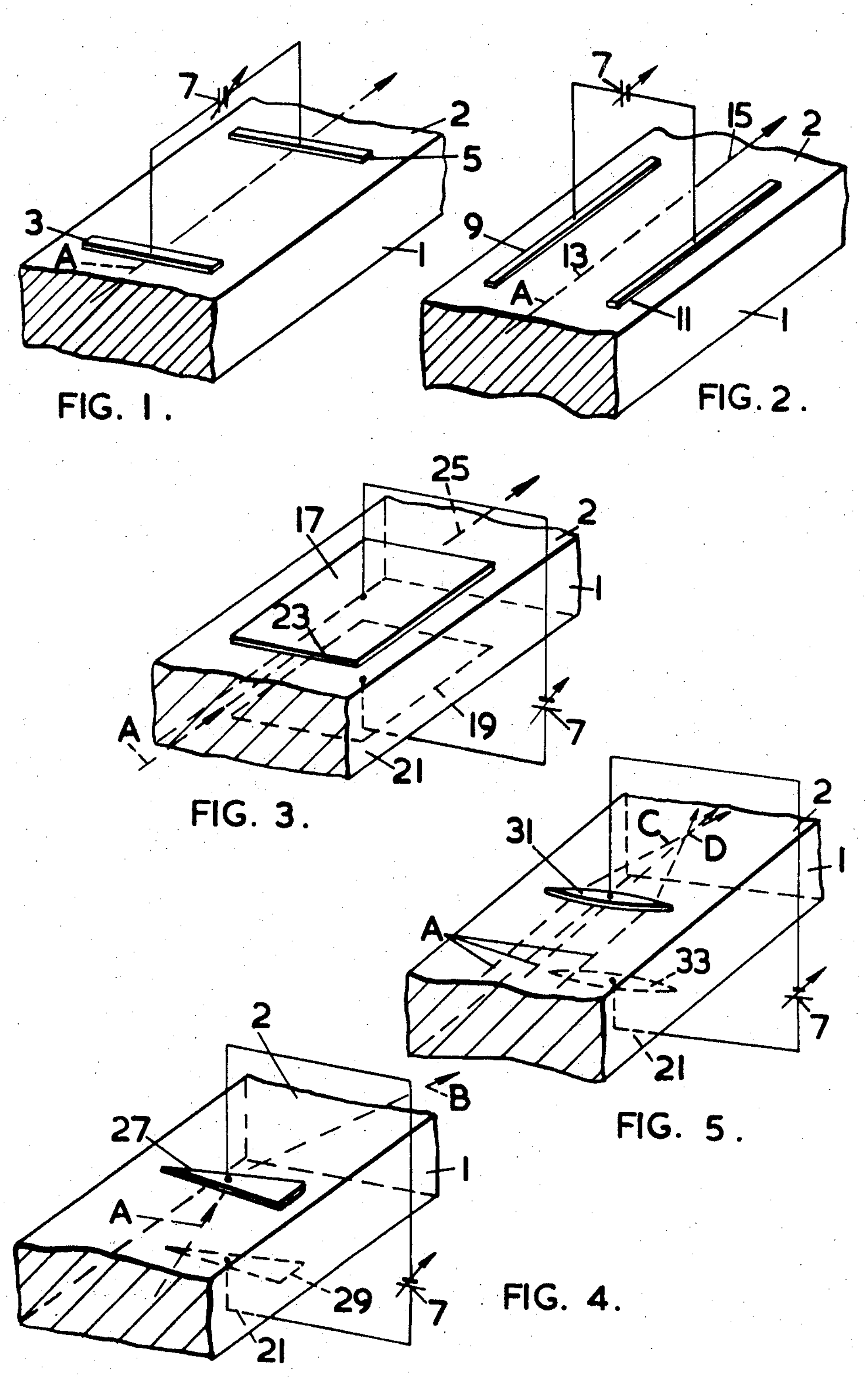
FIG. 1, 2 and 3 are perspective views of acoustic surface wave phase shifters.
FIGS. 4 and 5 are perspective views of an acoustic surface wave prism and an acoustic surface wave lens respectively.

FIG. 1 is a perspective view of an acoustic surface wave phase shifter. An acoustic surface wave A travels in the surface 2 of a body 1 of material of the type described. Two electrodes 3 and 5 are deposited on the surface 2 of the body 1. The electrodes 3 and 5 are parallel strips of metal both perpendicular to the direction of propagation of the acoustic surface wave A. The acoustic surface wave A is incident at the electrode 3 before it is incident at the electrode 5. A variable voltage source 7 is connected between the electrodes 3 and 5.

The action of the phase shifter is as follows. The phase of the acoustic surface wave A at the electrode 5 will depend upon the phase of the acoustic surface wave at the electrode 3 and the velocity of acoustic surface waves between the electrodes 3 and 5. In other words the phase of acoustic surface waves at the electrode 5 relative to that at the electrode 3 depends upon the velocity of acoustic surface waves between the electrodes 3 and 5. Since the material of which the body 1 is made is material of the type described, the phase of acoustic surface waves at the electrode 5 relative to that at the electrode 3 can be varied by varying the voltage of the voltage source 7.

FIG. 2 is a perspective view of an alternative acoustic surface wave phase shifter having parallel strip electrodes 9 and 11 deposited on the surface 2 of the body 1. The acoustic surface wave A is propagated parallel to the strip electrodes 9 and 11 and between them. A variable voltage source 7 is connected between the electrodes 9 and 11. The part of the path of the acoustic surface wave A where the acoustic surface wave A first comes under the influence of the electrodes 9 and 11 is labelled 13. The part of the path of the acoustic surface wave A where the acoustic surface wave A is no longer under the influence of the electrodes 9 and 11 is labelled 15.

The action of the phase shifter is as follows. The phase of acoustic surface waves at the point 15 relative to that at the point 13 depends as before upon the velocity of acoustic surface waves in the space between the electrodes 9 and 11. Since the material of which the body 1 is made is material of the type described, the phase of acoustic surface waves at the point 15 relative to that at the point 13 can be varied by varying the voltage of the voltage source 7.

FIG. 3 is a perspective view of another alternative acoustic surface wave phase shifter having a first electrode 17 deposited on the surface 2 of the body 1 in which the acoustic surface wave A is propagated and a second electrode 19 deposited on a parallel surface 21 opposite surface 2 of the body 1. A variable voltage source 7 is connected between the electrodes 17 and 19. The acoustic surface wave A is propagated in the surface 2 under the electrode 17 from a point 23 to a point 25.

The action of the phase shifter is as follows. The phase of acoustic surface waves at the point 25 relative to that at the point 15 depends upon the velocity of acoustic surface waves in the surface 2 under the electrode 17. Since the material of which the body is made is material of the type described, the phase of acoustic surface waves at the point 25 relative to that at the point 23 can be varied by varying the voltage of the voltage source 7.

The phase shifters described above with reference to FIGS. 1, 2 and 3 are examples of many possible electrode arrangements for acoustic surface wave devices embodying the invention. The electric fields are applied in the three phase shifters in directions which may be referred to as longitudinal, transverse and perpendicular respectively.

A frequency mixer may be constructed in a similar manner. The frequencies to be mixed in the frequency mixer would be that of the acoustic surface wave and that of the varying applied field applied by varying the voltage of the voltage source 7.

FIG. 4 is a perspective view of an acoustic surface wave prism. A triangular electrode 27 is deposited on the surface 2 of the body 1 in the path of an acoustic surface wave A. The emergent acoustic surface wave B will be at an angle to the acoustic surface wave A because the velocity of the acoustic surface wave will be altered when the acoustic surface wave passes into the region of the surface 2 under the electrode 27 and the angle between the edges of the electrode 27 where the acoustic surface wave enters and emerges will cause the wavefront of the acoustic surface wave and hence its direction of propagation to be deflected.

A second electrode 29 identical to the electrode 27 is deposited on the surface 21 exactly opposite to the electrode 27. A variable voltage source 7 is connected between the electrodes 17 and 19.

The action of the device is as follows. The angle through which the acoustic surface wave A is deflected is dependent upon the velocity of the acoustic surface wave in the surface 2 under the electrode 27. Therefore varying that velocity will vary the angle of deflection. The material of which the body 1 is made is material of the type described. Hence the angle of deflection may be varied by varying the voltage of the voltage source 7.

FIG. 5 is a perspective view of an acoustic surface wave lens. A lenticular electrode 31 is deposited on the surface 2 of the body 1 in the path of a parallel acoustic surface wave beam A. The emergent acoustic surface wave beam C will be convergent (in the case of a convexly lenticular electrode 31 which lowers the velocity of the acoustic surface wave travelling in the region of the surface 2 underneath the electrode 31) at a point D. This fact follows from the argument regarding the acoustic surface wave prism described above with reference to FIG. 4. In all cases a focal length can be defined by analogy with optical lenses.

A second electrode 33 identical to the electrode 31 is deposited on the surface 21 exactly opposite to the electrode 31. A variable voltage source 7 is connected between the electrodes 31 and 33.

The action of the device is as follows. The focal length of the acoustic surface wave lens is dependent upon the velocity of the acoustic surface wave in the surface 2 under the electrode 31. Therefore varying that velocity will vary the angle of deflection. The material of which the body 1 is made is material of the type described. Hence the focal length may be varied by varying the voltage of the voltage source 7.

Alternative electrode arrangements are possible for the acoustic surface wave prism and the acoustic surface wave lens. For example, a layer of conducting material prismatic or lenticular in shape may be deposited between the electrodes 3 and 5 in the device described with reference to FIG. 1 or between the electrodes 9 and 11 in the device described with reference to FIG. 2.

Varying the voltage applied between the electrodes will vary the velocity of the acoustic surface wave in the region surrounding the layer of conducting material. By this means variable deflection or focussing can be achieved by varying the applied voltage.

Figures 6, 7, 8, 9:
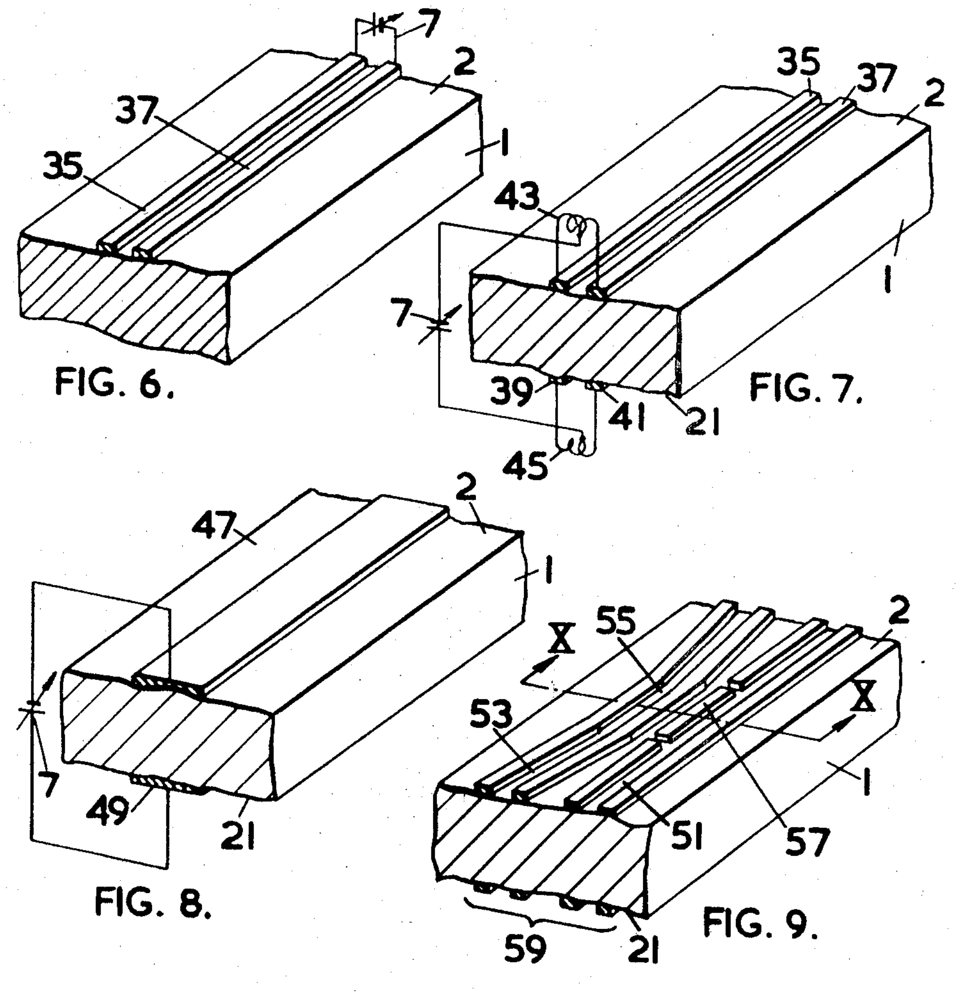
FIGS. 6, 7, 8, 9 and 11 are perspective views

FIG. 6 is a perspective view of an acoustic surface wave waveguide. Two parallel conducting strips 35 and 37 are deposited on the surface 2 of the body 1 and the distance between the strips 35 and 27 is sufficient to contain an acoustic surface wave. The variable voltage source 7 is connected between the strips 35 and 37. It is assumed that the mere presence of the strips 35 and 37 produces a negligible change in acoustic surface wave velocity.

The action of the waveguide is as follows. By the action of the voltage source 7 an electric field is set up. This electric field is transverse to the direction of propagation of the acoustic surface wave. It is only when the electric field is applied that the strips 35 and 37 act as a waveguide.

FIG. 7 is a perspective view of an alternative acoustic surface wave waveguide. The two parallel conducting strips 35 and 37 are deposited on the surface 2 of the body 1. Two further parallel conducting strips 39 and 41 are deposited on the surface 21 of the body 1 exactly opposite to the strips 35 and 37 respectively. The two strips 35 and 37 are connected to the two ends of an inductor 43. The two strips 39 and 41 are connected to the two ends of an inductor 45. The inductors 43 and 45 are both center tapped. The variable voltage source 7 is connected between the center taps of the two conductors 43 and 45. It is again assumed that the mere presence of the strips 35 and 37 produces a negligible change in acoustic surface wave velocity.

The action of the waveguide is as follows. By the action of the voltage source 7 an electric field is set up. This electric field is perpendicular to the direction of propagation of the acoustic surface wave. It is only when the electric field is applied that the strips 35 and 37 act as a waveguide. The purpose of the inductors 43 and 45 is to allow the low frequency or direct voltage from the voltage source 7 to be applied to the strips 35, 37, 43 and 45 while effectively keeping the strips 35 and 37 insulated from each other at the frequency of the acoustic surface wave.

FIG. 8 is a perspective view of a further alternative acoustic surface wave waveguide. A single conducting strip 47 is deposited on the surface 2 of the body 1. The width of the strip 47 is sufficient for an acoustic surface wave to be propagated in the surface 2 under the strip 47. A further conducting strip 49 is deposited on the surface 21 of the body 1. The variable voltage source 7 is connected between the strips 47 and 49. It is assumed that the mere presence of the strip 47 produces a negligible change in acoustic surface wave velocity.

The action of the waveguide is as follows. By the action of the voltage source 7 an electric field is set up. This electric field is perpendicular to the direction of propagation of the acoustic surface wave. If the acoustic loading of the strip 47 is negligible, then it is only when the electric field is applied, changing the velocity of the acoustic surface wave, that the strip 47 acts as a waveguide.

Clearly when guidance of acoustic surface waves is achieved in one of the waveguides described with reference to FIG. 6, FIG. 7 or FIG. 8, mixing and variable phase shift is possible on the same principles as described above with reference to FIG. 1, FIG. 2 or FIG. 3. By varying the voltage of the source 7, the loss through the walls in the waveguide may be controlled and this may provide the basis of a variable attenuator.

The invention may be used in a variety of possible arrangements for a variable coupling directional coupler. FIG. 9 is a perspective view and FIG. 10 a cross-sectional diagram of one possible variable coupling directional coupler. A first acoustic surface wave waveguide 51 of the type described with reference to FIG. 7 is deposited on the surface 2 of the body 1. A second acoustic surface wave waveguide 53 of the same type is deposited adjacent to the waveguide 51. The waveguide 53 is not straight but has a short portion 55 which is closer to the waveguide 51 than the rest of the waveguide 53. A part 57 of one wall of the waveguide 51 is insulated from the remainder of the wall. The part 57 is adjacent to the portion 55 of the waveguide 53 and belongs to that wall of the waveguide 51 which is closer to the waveguide 53. Metal strips 59 are deposited on the surface 21 of the block 1 exactly opposite to the waveguides 51 and 53.

Figure 10:
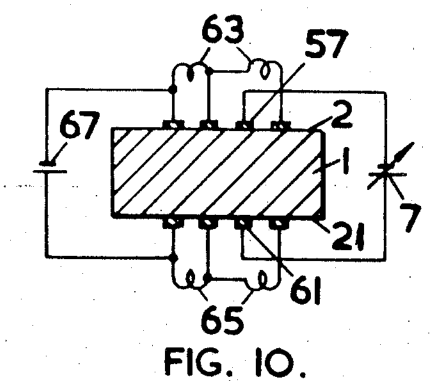
FIG. 10 is a cross-sectional diagram of acoustic surface waveguide devices.

The electrical connections between the strips is illustrated in FIG. 10, which is a cross-sectional diagram on the line X̄ - X̄ of FIG. 9. The variable voltage source 7 is connected between the strip 57 and its opposite strip 61. The remaining strips on the surface 2 are connected together via inductors 63 and the remaining strips on the surface 21 are connected together via inductors 65 and a variable voltage source 67 is connected between the strips deposited on the surface 2 and the strips deposited on the surface 21.

The action of the device is as follows. The action of the voltage source 7 allows the local electric field between the strip 57 and the strip 61 to be different from that elsewhere along the waveguides 51 and 53. In other words the part of the waveguide 51 at the strip 57 may be made leaky through field dependent velocity changes in the waveguide wall in a controlled manner. By this means the acoustic flux transferred from one waveguide to the other in the directional coupler can be controlled by the externally applied voltage.

Figure 11:
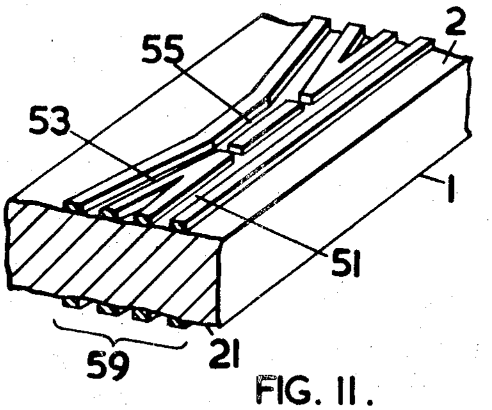

Clearly a large number of possible alternative directional couplers may be made. One such is illustrated in FIG. 11 which only differs from FIG. 10 in that at the portion 55 of the waveguide 53 the two waveguides share a common wall, namely the aforementioned strip 57.

Figure 12:
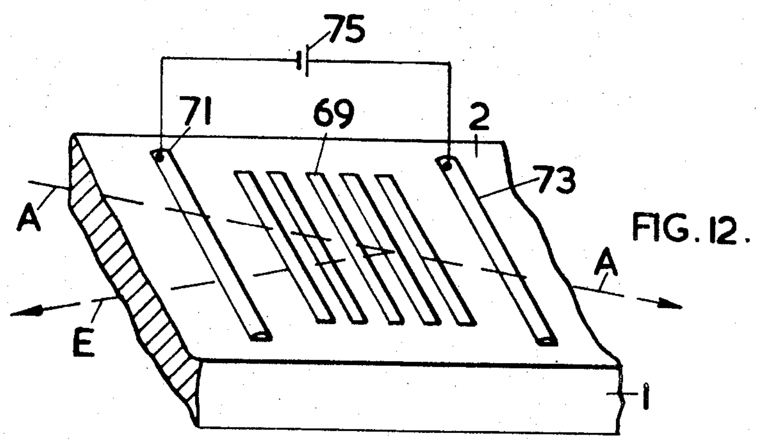
FIG. 12 is a perspective view of an acoustic surface wave multiple (or Bragg) reflector.

FIG. 12 is a perspective view of a multiple (or Bragg) reflector. An array 69 of parallel conducting strips is deposited on the surface 2 of the body 1. The distance between adjacent strips is a uniform distance $d$. Two further electrodes 71 and 73 are deposited, one on either side of the array 69. A voltage source 75 is connected between the electrodes 71 and 73.

The action of the reflector is as follows. By connecting the voltage source 75 an electric field is applied in the surface 2. An acoustic surface wave A having an incident angle $\theta$ between its direction of propagation and the normal to the strips in the array 69 will be reflected back in a direction E having a reflected angle $\theta$ between the direction of propagation and the normal to the strips in the array 69 but on the other side of the normal from the incident angle. The wavelength $\lambda$ of the acoustic surface wave in the medium of which the body 1 is made is related to the distance $d$ between adjacent strips in the array 69 and the angle $\theta$ by the relation $\lambda = 2d\cos\theta$.

However, when the voltage source 75 is removed, reflection will not take place (with the proviso noted below). Therefore by means of such a device the acoustic surface wave A may be reflected in the direction E or propagated in its original direction by switching on and off the voltage source 75.

Figure 13:
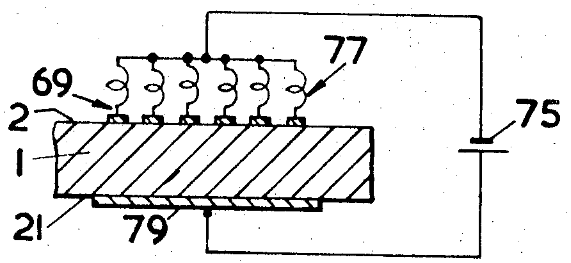
FIG. 13 is a cross-sectional diagram of a further acoustic surface wave multiple reflector.

FIG. 13 is a cross-sectional diagram of an alternative multiple reflector which differs from that described above with reference to FIG. 12 in that the electric field is applied to the block 1 in a direction which is perpendicular to the surface on which the acoustic surface wave is propagating and not in the plane of that surface, as in the preceding example. This is achieved by connecting one terminal of the voltage source 75 between the members of the array 69 via separate inductors 77, and by connecting the other terminal to an electrode 79 deposited on the surface 21 of the body 1.

The action of the multiple reflector is identical with the action of the multiple reflector described above with reference to FIG. 12 except that the electric field is in this case perpendicular to the direction of propagation of the acoustic surface wave.

It is to be noted that because velocity modulation is not symmetrical about that of the unperturbed wave there is a net change in frequency response of the structure. This is because of the relation quoted above $$\lambda = 2d\cos\theta$$

because of the presence of the electric field the frequency/wavelength relationship is changing. Thus by means of the applied external field, not only is beam switching possible but also variable frequency selection of components diffracted can be achieved.

Figure 14:
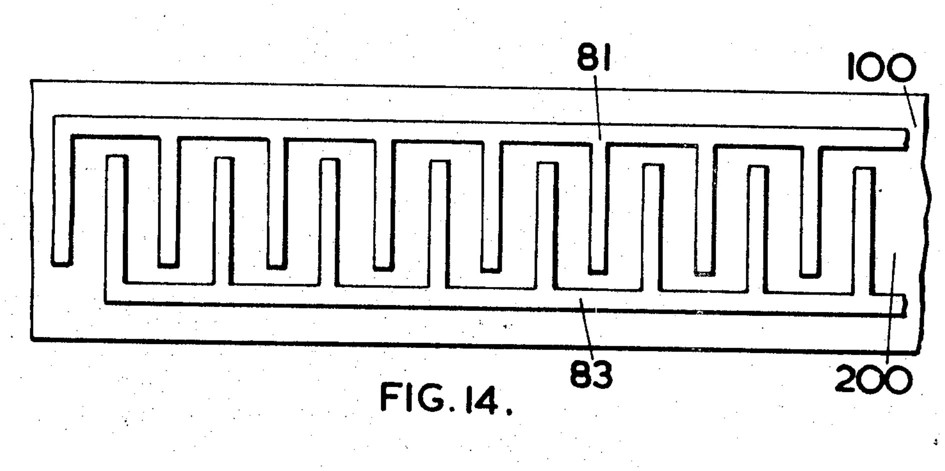
FIGS. 14 and 15 are plan views of known interdigital comb transducers.

FIG. 14 is a plan view of a known interdigital comb transducer. An electrode 81 in the form of a comb is deposited on the surface 200 of a body 100 of piezoelectric material. A further electrode 83 in the form of a comb is deposited on the surface 200 of the body 100. The electrodes 81 and 83 are so arranged that the fingers of the two combs are parallel and arranged alternately beside one another. The digital spacing, (i.e. the spacing between adjacent fingers of one electrode) is constant and is the wavelength in the surface 200 of the body 100 of an acoustic surface wave. The phase velocity of acoustic surface waves in such a medium is some $3 \times 10^5$cm per second and so for an acoustic surface wave having a frequency of 100MHz the digital spacing of an electrode such as the electrode 81 is some 30 microns.

The action of the transducer is as follows. An oscillator of the appropriate frequency is connected between the electrodes 81 and 83. An acoustic surface wave of that frequency is thereby generated and propagated in both directions perpendicular to the fingers of the electrodes 81 and 83.

Alternatively the transducer may be used as a detector of acoustic surface waves which are incident on the fingers of the electrodes 81 and 83. Such acoustic surface waves will induce an alternating voltage between the electrodes 83 and 81 and that voltage may be detected in a suitable receiver connected between the electrodes 81 and 83.

In a similar interdigital comb transducer embodying the invention, the electrodes are deposited on material of the type described. By this means appreciable modulation of the velocity of the acoustic surface wave under the transducer structure may be achieved. This modulation will not occur symmetrically about the velocity of the unperturbed acoustic surface wave and consequently there will be a change in the frequency response of the transducer structure with applied field. The modulation may be achieved via an electrode similar to the electrode 79 described with reference to FIG. 13.

In a further extension of the invention means may be envisaged for introducing a spatially varying field under the transducer structure enabling a more complex frequency response to be obtained, and enabling this frequency response to be varied by varying an applied voltage. This would be of significance in matched filter design. For example, a variably dispersive transducer for pulse compression radar purposes may be built.

Figures 15, 16, 17:
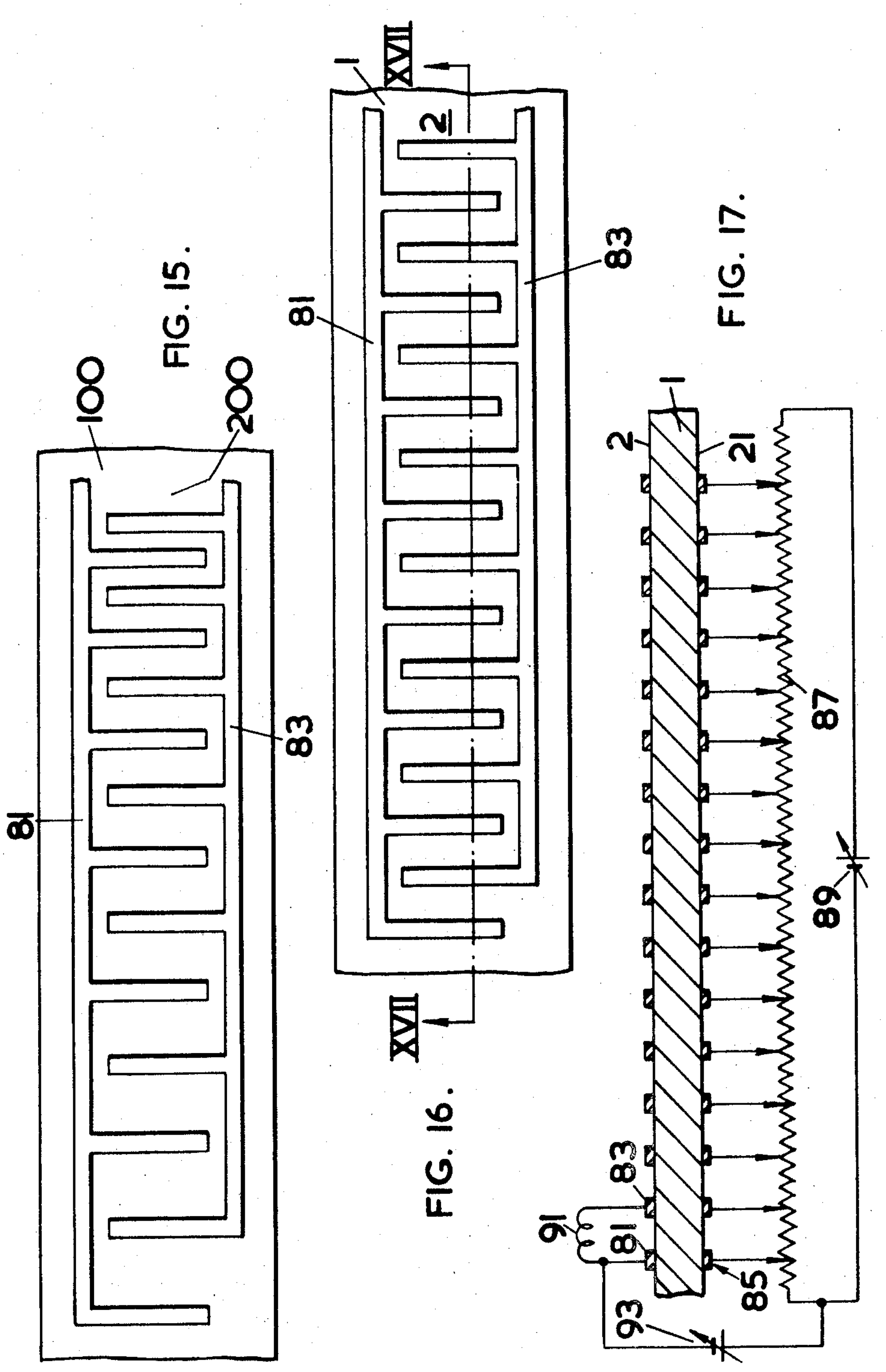
FIG. 16 is a plan view and FIG. 17 is a cross-sectional diagram of an interdigital comb transducer embodying the invention.

FIG. 15 is a plan view of a known dispersive interdigital comb transducer. This transducer differs from that described above with reference to FIG. 14 only in that the digital spacing is not constant but increases gradually from one end to the other. In a practical device refinements such as variations in the width and length of the fingers along the transducer might be added.

The action of the transducer is as follows. Consider a pulse of acoustic surface wave energy approaching the transducer from such a direction that it reaches the end where the digital spacing is largest. Then the transducer will be initially responsive to relatively low frequencies in the pulse. As the pulse progresses through the transducer it will reach parts where the digital spacing is narrower. As this happens the transducer will be responsive to higher frequencies. The process continues until the pulse emerges from the end of the transducer where the digital spacing is lowest. The electrical output from the transducer will therefore be a dispersive wave, i.e. a wave having a frequency which increases in time from its beginning to its end. Clearly the transducer can be used to reconstitute the wave into a pulse, and both the dispersion and reconstitution can take place from an acoustic surface wave input to an electrical output and vice versa.

FIG. 16 is a plan view and FIG. 17 is a cross-sectional diagram of an interdigital comb transducer embodying the invention. The comb electrodes 81 and 83 are deposited on the surface 2 of the body 1 of material of the type described. The digital spacing is constant. A plurality of strip electrodes 85 is deposited on the surface 21 of the block 1 exactly opposite to the fingers of the electrodes 81 and 83. The electrodes 85 are separately connected in order to individual tapping points of a potentiometer 87. A variable voltage source 89 is connected across the ends of the potentiometer 89. An inductor 91 is connected between the electrodes 81 and 83 and one terminal of the inductor 91 is connected to one terminal of the potentiometer 89 via a second variable voltage source 93.

The action of the transducer is as follows. By the action of the voltage source 89 an electric field is set up between the electrodes 81 and 83 on the one hand and the electrodes 85 on the other hand. By the action of the potentiometer 87 the electric field varies along the transducer. Therefore the frequency response of the transducer will vary along its length. It follows that the transducer will be dispersive in a similar way to that described above with reference to FIG. 15.

Furthermore the dispersion of the transducer will be variable by varying the voltages of the sources 89 and 93.

Figure 18:
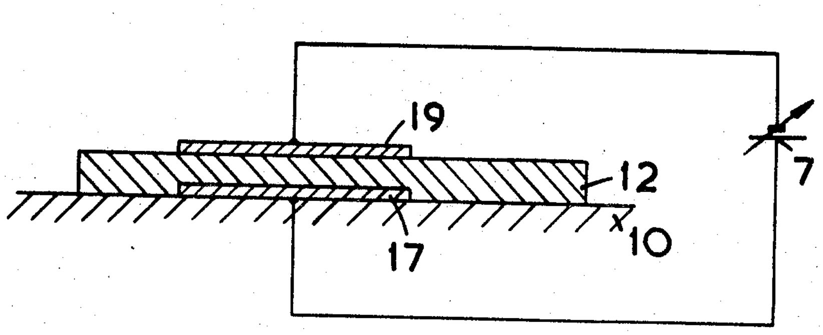
FIG. 18, which is a cross-sectional diagram of an alternative acoustic surface wave phase shifter.

FIG. 18 is a cross-sectional diagram of an alternative acoustic surface wave phase shifter. An electrode 17 similar to the electrode 17 in FIG. 3 is deposited on a substrate 10 of material which is not material of the type described. A film 12 of material of the type described is deposited on the surface of the substrate 10 over the electrode 17. The thickness of the film 12 is smaller than or comparable with the wavelength in the material of the acoustic surface wave. An electrode 19 is deposited on the surface of the film 12. A variable voltage source 7 is connected between the electrodes 17 and 19. The acoustic surface wave is propagated in the surface of the substrate 10.

The action of the phase shifter is as follows. The phase of acoustic surface waves in the substrate 10 where they emerge from the film 12 relative to that where they enter the film 12 depends upon the velocity of acoustic surface waves in the film 12. Since the material of which the film 12 is made is material of the type described, the phase of acoustic surface waves at the point where they emerge from the film 12 can be varied by varying the voltage of the voltage source 7.

Such an arrangement may be applied to all the embodiments of the invention herein described. It will allow launching, reception and processing of acoustic surface waves in the surface of material which is not of the type described. For example, acoustic surface waves may be made to travel in silicon (which may be part of an integrated circuit or isopaustic glass (i.e. glass in which the time delay is substantially independent of temperature over a reasonable range).

Suitable materials for the invention include ferroelectric materials near their Curie temperature, such as tri-glycine sulphate or KTN (potassium tantalum niobate). Suitable materials include both materials whose electrostrictive tensors or electro-elastic stiffness tensors have elements that are sufficiently large but which are non-piezoelectric and material which are piezoelectric but by choice of orientations of field, crystal directions and surface wave have a piezo-electric constant zero or so small as to be negligible.

What I claim is:

1. An acoustic surface wave device comprising a body of material which has, belonging to its electro-elastic stiffness tensors, at least one tensor element of sufficient magnitude to allow the velocity of an acoustic surface wave traveling in a first given direction to be varied significantly in response to variation of an electric field applied in a second given direction across the body of material, means for launching an acoustic surface wave in the first given direction in the surface of the body of material, and means for applying an electric field in the second given direction across the body of material.

2. An acoustic surface wave device as claimed in claim 1, including a substrate of material different from said material of said body, said body of material being in the form of a layer on said substrate.

3. An acoustic surface wave device as claimed in claim 2 in which the thickness of said layer is less than the wavelength in said body of material of an acoustic surface wave, said substrate being made of material which is physically capable of supporting an acoustic surface wave.

4. An acoustic surface wave device as claimed in claim 1 wherein said means for applying an electric field comprises at least one pair of interdigital comb electrodes so arranged that said field may be applied in the region of said comb electrodes.

5. An acoustic surface wave device as claimed in claim 1 wherein said means for applying an electric field includes at least one extended electrode distributed over said body of material in at least one dimension, and means for applying different electric fields across parts of said body having different parts of said extended electrode on it whereby the velocity of acoustic surface waves differs at different parts of said extended electrode.

6. An acoustic surface wave device as claimed in claim 1 wherein said means for applying an electric field is arranged so that said second given direction, in which said electric field is applied, is parallel to said first given direction in which an acoustic surface wave travels.

7. An acoustic surface wave device as claimed in claim 1 wherein said means for applying an electric field is arranged so that said second given direction, in which said electric field is applied, is perpendicular to said first given direction in which an acoustic surface wave travels.

8. An acoustic surface wave device which relies for its effectiveness on the electrostrictive effect rather than on the piezoelectric effect whereby the effectiveness of the device is electric field dependent, said device comprising a body of material which has electrostrictive constants and piezoelectric constants such that for an acoustic surface wave traveling in a first given direction in said body and an electric field applied across said body in a second given direction the piezoelectric effect is ngligible but the electrostrictive effect is significant, and means somprising a multiple acoustic surface wave reflector for modifying the velocity of an acoustic surface wave traveling in said body in said first given direction, said velocity modifying means including means for applying an electric field in the region of said reflector across said body of material in said second given direction.

9. An acoustic surface wave device which relies for its effectiveness on the electrostrictive effect rather than on the piezoelectric effect whereby the effectiveness of the device is electric field dependent, said device comprising a body of material which has electrostrictive constants and piezoelectric constants such that for an acoustic surface wave traveling in a first given direction in said body and an electric field applied across said body in a second given direction the piezoelectric effect is negligible but the electrostrictive effect is significant, and means for modifying the velocity of an acoustic surface wave traveling in said body in said first given direction, said velocity modifying means including means for applying an electric field across said body of material in said second given direction, said modifying means comprising a phase shifter which includes two electrodes so deposited on said body as to cause a phase shift in an acoustic surface wave traveling in the proximity of one of said electrodes, at least one of said electrodes being so shaped as to give different phase shifts to acoustic surface waves in different parts of said body of material in order to control the wavefront of the acoustic surface waves.

10. An acoustic surface wave device as claimed in claim 9 wherein said two electrodes are so deposited on said body of material as to constitute an acoustic surface wave waveguide.

11. An acoustic surface wave device as claimed in claim 10 further including a steering electrode so deposited on said body of material that altering the voltage applied to said steering electrode will cause acoustic surface wave steering, and means for controllably altering the voltage applied to said steering electrode.

* * * * *